No. 834,669. PATENTED OCT. 30, 1906.
W. A. FRICKE.
TEST AND WIRE CONNECTOR.
APPLICATION FILED OCT. 24, 1904.

Witnesses.

Inventor:
William A. Fricke,
By Robert Lewis Ames,
Attorney.

UNITED STATES PATENT OFFICE.

WILLIAM A. FRICKE, OF CHICAGO, ILLINOIS.

TEST AND WIRE-CONNECTOR.

No. 834,669.  Specification of Letters Patent.  Patented Oct. 30, 1906.

Application filed October 24, 1904. Serial No. 229,729.

*To all whom it may concern:*

Be it known that I, WILLIAM A. FRICKE, a citizen of the United States, residing at Chicago, in the county of Cook and State of Illinois, have invented a new and useful Test and Wire-Connector, of which the following is a specification.

My invention relates to a test and wire-connector for connecting electrically and mechanically two or more wires for conveying electrical currents, the object being to provide a test and wire-connector, first, that will clamp two or more wires of the same or different sizes in a secure position for ordinary use; second, that can be easily and quickly opened without injuring the connector for testing or other purposes; third, that will serve either for connecting together wires from as large as is used to as small as is used in ordinary telephone or telegraph construction; fourth, that can be applied to join continuous wires, a wire end to a continuous wire, or two or more wire ends; fifth, that will hold wires securely in position and prevent them from slipping or working out of position, due to vibrations or any other cause, and, sixth, that will be very simple and of few parts, cheap in cost to manufacture, and durable and efficient in operation.

My invention is especially applicable to telephone and telegraph wires at points where it is desirable to test the same from time to time either by opening the main line or by merely connecting the test-wires thereto or where it is desired to connect a branch wire to a continuous main wire, as is frequent in telephone practice. Two main telephone or telegraph wires to be connected in this manner will usually be of the same size, No. 12 (diameter .104 inch) and No. 14 (diameter .080 inch) being the two sizes of wire commonly used in telephone construction. In case of "legging" a branch wire to a continuous main-line telephone-wire the main line will ordinarily be No. 12 and the branch wire No. 14 in size.

Heretofore several styles of connectors have been used for the purpose of joining wires. One of these is what is known as "sleeve-joint," consisting of a single or double tube, which must be slipped over the ends of the wires and is therefore not applicable to a continuous wire to which a branch is to be connected. Another form which may be more generally applied is of sheet-copper made in S-shaped cross-section. Both of these forms must be twisted to establish good contact and must therefore be injured when it is desired to open the connection. These forms must also be suited to the particular size of wire to be used.

Other forms of connectors now in use are objectionable on account of being able to grip but two wires and not being able to connect at once two or more wires of different sizes.

My invention is designed to overcome the difficulties mentioned, and preferably consists of three or more metal plates having in the top plate a groove and on the lower plates other grooves, preferably one on each side, and in which the wires are clamped and firmly held by a screw bolt or stud fastened to the upper plate and passing through the other plates over the wires and being locked in position by a nut. A second nut can be used as a lock, if preferable. The arrangement of the screw-bolt or stud which passes through the plates and over the wires, as hereinafter described, renders the clamp applicable to any two or more wires of the same or different diameters, to two or more continuous wires, to the connection of one or more wire ends to a continuous wire, and to the joining of two or more wire ends.

The device is capable of easy disconnection for the purposes of electrical testing or pulling up slack of wires or can be entirely removed and utilized again. It is of advantage in the art of telephone and telegraph line construction to have one article applicable to these common uses. The use of my device is not limited, however, to telephone and telegraph wires, as described, but is adapted to electric light and power wires, battery connections, inside wiring, wire fence, and wirework of almost any other description in which a simple electrical or mechanical connection is desired. The size and strength of the connector can of course be varied to suit the particular use for which it is intended.

My invention is illustrated in the accompanying drawings, in which the same reference characters are employed throughout the various views to designate the same parts, and in which—

Figure 1 is a top plan view of one form of the invention, showing a large and a small wire clamped therein. Fig. 2 is a side elevational view of the same. Fig. 3 is a similar view of a slightly-modified form, showing two large wires therein. Fig. 4 is a side view of the same device as in Fig. 3, but clamping two small wires. Fig. 5 is an end view of the device of Figs. 1 and 2. Figs. 6 and 7 are transverse sectional views of the devices of Figs. 3 and 4. Fig. 8 is a detail view of the detached parts of the device of Figs. 1 and 2. Fig. 9 is a similar view of the device of Figs. 3 and 4. Fig. 10 is a side view of a modified form of the invention, and Fig. 11 is a similar view of still another form.

Referring first to Figs. 1, 2, 5, and 8, the device comprises a top plate 2 and other plates, such as 3 and 4, in any desired number, according to the number of wires that it is desired to connect. The plates are provided upon their adjacent faces with centrally-disposed longitudinal grooves 5, in which the wires 6 and 7 are adapted to lie when the plates are clamped thereon. For the purpose of thus clamping these several plates together and upon the wires a screw-bolt 8, having a head 9 and a nut 10 and provided with a slot 11, passes through suitably-formed apertures 12 in said plates, as shown, the said slots being of sufficient width to straddle the largest wires to be encountered in practice. When the nuts 10 are tightened, the plates 2, 3, and 4 are clamped upon the wires 6 and 7, which are held in the same plane by the grooves 5 in the opposed faces of the plates. The tongue of the plates passing through the slot in the bolt keeps the plates from turning upon the bolt and also keeps the two parts of the bolt from springing together when the nut is tightened. A slot 13 in the head of the bolt permits the use of a screw-driver, if such is desired. The groove in the outer face of plate 4 is unnecessary unless additional plates are added, so that the device can accommodate more wires; but by making all such plates alike no trouble is caused by the necessity of selecting the proper plates to be used.

In Figs. 3, 4, 6, 7, and 9 the separate clamping-bolt is replaced by the screw-stud 8ᵃ, fixedly secured in any desired way to the top plate 2ᵃ, the said stud then passing through the other plates 3 and 4 and receiving the nut 10 upon its outer end, which when tightened firmly clamps the wires in position.

As shown in Fig. 1, two or more wires of different sizes may be clamped together, or, as in Figs. 3 and 4, two or more wires of the same or of any desired size may be connected and all without any change in the device. The wires are preferably held in parallel relation in the same plane—that is, not end to end or alined, but with ends overlapping—or, as has been explained, two or more continuous wires may be connected. The device is extremely simple in construction and operation and efficient, as the wires are firmly held in good electrical and mechanical contact. Should the device become accidentally loosened upon the wires, it is not lost, since unless it slips off the ends of the wires it cannot be separated therefrom.

Fig. 11 shows the threaded-stud idea applied to this same form of connector, the plate 2ᶜ having a plurality of studs 8ᵃ fastened thereto and the transverse grooves 5ᵃ formed therein. The manner of using the device is obvious.

Figure 1:
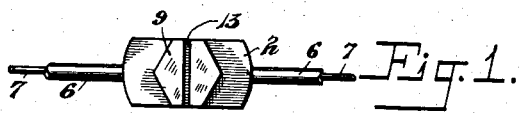
Figure 2:
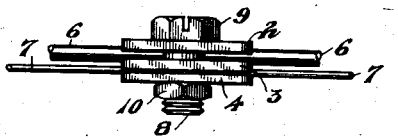
Figure 3:
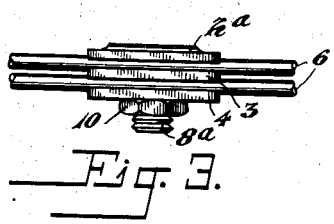
Figure 4:
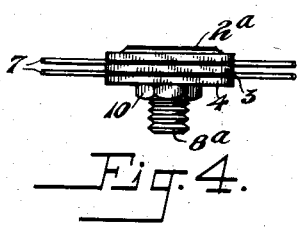
Figure 6:
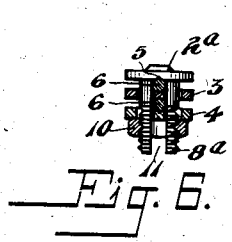
Figures 5, 7:
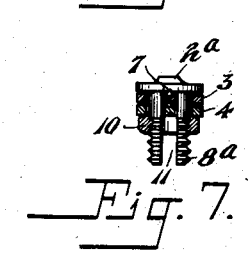
Figure 8:
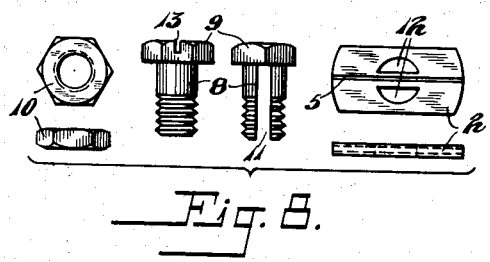
Figure 9:
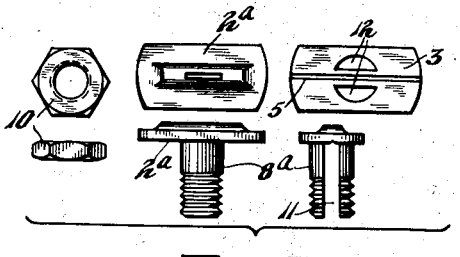
Figure 10:
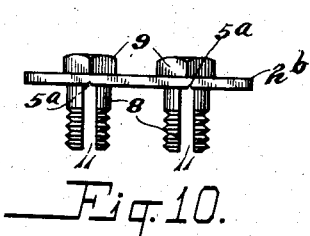
Figs. 10 and 11 show a form of the device designed to accommodate a greater number of wires, the plates, such as 2ᵇ, being provided with two or more bolts 8, the grooves 5ᵃ in this instance running transversely of the plates. It will be understood that additional plates having coöperating bolt-apertures and transverse grooves are employed with the plate 2ᵇ, the same as in the previous figures.
Figure 11:
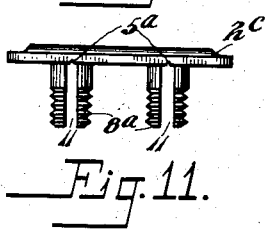

While the connector may be made of any suitable metal, it is desirable to have the plates made of the same metal as the wire to be joined and that the whole be reasonably non-corrosive. For copper wire, as heretofore indicated, it is preferable to make the connector with copper plates and a brass bolt and nut. Cheaper metals, plated or otherwise protected against corrosion, may, however, be used.

While the invention has been described with particular reference to the details of construction, I would have it understood that it is not to be limited thereto, as it is apparent to those skilled in the art to which the invention appertains that many changes, alterations, and modifications may be made therein and still come within its scope and principle; but What I do claim, and desire to secure by Letters Patent, is—

1. In a wire-connector, the combination with a plurality of adjacent plates constructed and arranged to receive a single one of a plurality of unalined wires between the adjoining faces of each pair of plates, and contact with said wire throughout the median dimension of said plates, of a single means for clamping all of said plates together upon said wires; substantially as described.

2. In a wire-connector, the combination with a plurality of adjacent perforated plates constructed to receive a plurality of continuous wires between them, of a bifurcated member adapted to pass through said plates and astride said wires, a single clamping means for securing all of said plates and wires and means for preventing the bifurcated member from springing out of contact with the clamping means; substantially as described.

3. In a wire-connector, the combination with a plurality of plates grooved on their adjacent faces, some of said plates being provided with non-circular perforations, of a slotted connecting member constructed to pass through said plates, and a single clamping means for securing said parts, whereby continuous wires of different sizes may be secured between said plates and in the slot of said connecting member; substantially as described.

4. In a wire-connector, the combination with a plurality of adjacent perforated plates adapted to receive unalined wires between them, of a connecting member passing through said plates, a single means for clamping all of said plates and wires together, and means for preventing the turning of said plates on said connecting member; substantially as described.

5. In a wire-connector, the combination with a plurality of adjacent perforated plates adapted to receive wires between them, a bifurcated connecting member adapted to pass through said plates and to receive a plurality of unalined wires between its prongs, and clamping means for said plates and wires, said plates having tongues extending between the prongs of the connecting member, to prevent said plates from turning upon said member; substantially as described.

6. In a wire-connector, the combination of a slotted connecting member, a plurality of plates each provided with paired perforations, separated by an integral tongue arranged to pass into the slot of said connecting member and to receive wires between said tongues, and clamping means operatively connected to said slotted member; substantially as described.

7. In a wire-connector, the combination of a plurality of intermediately-tongued, perforated plates, a slotted connecting member arranged to receive the tongues of said plates and a plurality of unalined wires, and means for clamping said plates and wires in said slot; substantially as described.

8. In a wire-connector, the combination with a plurality of plates having grooves on their adjacent faces adapted to receive continuous wires of different sizes and paired perforations, one on each side of said grooves, of a bifurcated connecting member passing through said perforations, and a single means for clamping said plates and wires; substantially as described.

In witness whereof I hereunto subscribe my name in the presence of two witnesses.

WILLIAM A. FRICKE.

Witnesses:
EDITH F. GRIER,
ROBERT LEWIS AMES.